Feb. 20, 1951     H. R. AMUNDSEN     2,541,978
FRICTION BRAKE AND CLUTCH
Filed March 2, 1946

Inventor:
Hans R. Amundsen
Thiess, Olson & Mecklenburger
Attys.

Patented Feb. 20, 1951

2,541,978

UNITED STATES PATENT OFFICE 2,541,978

FRICTION BRAKE AND CLUTCH

Hans R. Amundsen, Oak Park, Ill.

Application March 2, 1946, Serial No. 651,538

15 Claims. (Cl. 192—107)

My invention relates to friction brakes and clutches.

This invention is in the nature of an improvement or modification of the invention disclosed in my co-pending application Serial No. 534,632, filed May 8, 1944, which has become Patent No. 2,402,005, dated June 11, 1946.

One of the objects of my invention is to provide an improved brake or clutch construction in which the brake or clutch blocks are secured to the shoe without the use of bolts or rivets in the friction material which will enable the removable and replacement of the blocks without removing the shoe from its place by means of an improved positioning and clamping strip of wedge-like channeled cross section.

A further object is to provide such a construction in which the clamping strip is secured on the shoe and clamped in place to hold the block in position by means of headed bolts, the heads of which are seated in the channel.

A further object is to provide such a construction in which the bolts are prevented from turning by engagement of the heads of the bolts with the side flanges on the channeled clamping strips.

Further objects and advantages of the invention will be apparent from the description and claims.

In the drawings, in which an embodiment of my invention is shown.

Figure 1:
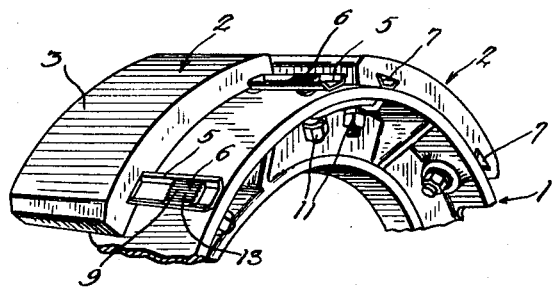
Figure 1 is a perspective view showing a brake or clutch shoe, a plurality of brake or clutch blocks and clamping means for securing the blocks to the shoe.
Figure 2:
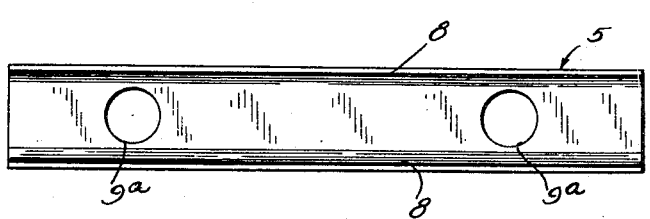
Fig. 2 is a plan view of the clamping strip.
Figure 3:
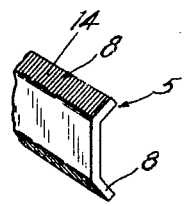
Fig. 3 is a perspective view of one end of the clamping strip.
Figure 4:
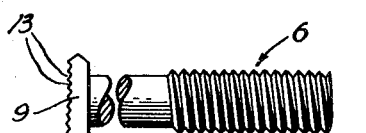
Fig. 4 is a side elevation of the clamping bolt.
Figure 5:
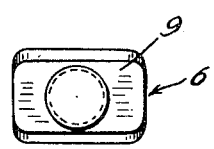
Fig. 5 is a view of Fig. 4 from the right.

Referring to the drawings in detail, the construction shown comprises a brake or clutch shoe 1 for an internal expanding brake or clutch and a plurality of asbestos combination friction blocks 2 having coaxial sectoral cylindrical face and back surfaces 3 and 4. The back surface 4 is engageable with the face of the shoe 1. The face surface 3 is a friction surface for frictionally engaging a complementary relatively rotatable cylindrical brake or clutch drum to check relative rotation between said surfaces.

A channel-like guiding and clamping strip 5 is provided for guiding and clamping the blocks 2 with respect to the shoe 1 having clamping bolts 6 for drawing the clamping strip 5 toward the shoe 1. Each block has a pair of dovetail grooves 7 in its back carrier engaging surface 4 extending longitudinally of the axis of the carrier or shoe 1 and extending completely across the back surface for engaging and receiving the guiding and clamping strip 5. The channel-like strip has uniformly sloping side flanges 8, the dovetail grooves 7 in the block having uniformly sloping sides engageable with the sloping flanges 8 of the clamping strip throughout the length of the strip. The heads 9 of the bolts 6 lie between the flanges 8 and engage the flanges to hold the bolts against rotation. The shanks 10 of the bolts extend through openings 9ª and 10ª in the channel and shoe, respectively, and are provided with nuts 11 which are turned up to tighten the clamps to secure the blocks firmly in position on the shoe.

Figure 6:
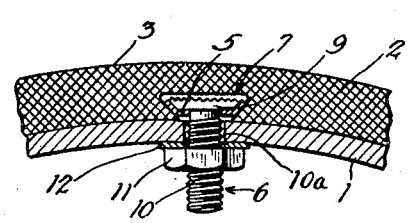
Fig. 6 is a transaxial view showing the manner of securing the brake block to the shoe.
Figure 7:
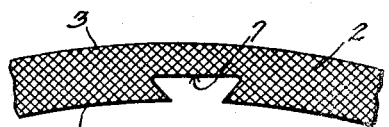
Fig. 7 is a transaxial view of a portion of the brake block.

The radial depth of the groove is somewhat greater than the radial height of the clamping strip, as shown in Fig. 6, whereby when the strip is drawn toward the shoe the shoe-engaging face of the block will be clamped tightly against the shoe, leaving a substantial space between the shoe and clamping strip. A lock washer 12 may be provided between the nut and shoe.

Any suitable material may be used for the clamping strip 5. I have found in practice that brass is satisfactory for this purpose. The bolts may be formed in any suitable manner, as by upsetting or swaging the head 9 so as to make it extend laterally in both directions from the axis of the bolt and fit snugly between the flanges of the channel-like strip. To assist the flow of metal in this swaging operation, the dies may be provided with corrugations 13 extending in the general direction of lateral flow of the material.

With this construction, if a friction block 2 is worn out or damaged so that it has to be removed, this can be done, leaving the brake shoe or brake band and the clamping strip 5 and bolts 6 in place by loosening the nuts 11 which hold the worn block in place and forcing the worn out block to slide laterally along the strips.

In order to insure that there shall be no side slip, the outer sides of the sloping side flanges 8 may be knurled or provided with corrugations 14 which will engage the side edges of the dovetail grooves 7 of the friction blocks 2.

Further modifications will be apparent to those skilled in the art and it is desired, therefore, that the invention be limited only by the scope of the appended claims.

Having thus described my invention, what I claim and desire to secure by Letters Patent is:

1. A clutch or brake construction comprising a friction block carrier, a friction block, a beam-like channel-like guiding and clamping strip for guiding and clamping said block to said carrier, and one or more threaded clamping bolts for drawing said strip toward said carrier, said friction block having face and back surfaces, said face surface being a friction surface for frictionally engaging a complementary relatively rotatable friction surface to check relative rotation between said surfaces about a common axis, said carrier having a surface for engagement with the back surface of said block, said block having one or more dovetail grooves in its back-engaging surface extending across said back surface for engaging and receiving said guiding and clamping strip, said channel-like strip being substantially coextensive lengthwise with respect to said groove and having side flanges, said dovetail groove having shoulders engageable with the flanges of said clamping strip, the head of said bolt lying between said flanges and the shank extending through openings in the bottom of said channel and in said carrier, the depth of said groove being greater than the height of said head and beam-like strip when assembled.

2. A clutch or brake construction comprising a friction block carrier, a friction block, a beam-like channel-like guiding and clamping strip for guiding and clamping said block to said carrier, and one or more threaded clamping bolts for drawing said strip toward said carrier, said friction block having face and back surfaces, said face surface being a friction surface for frictionally engaging a complementary relatively rotatable friction surface to check relative rotation between said surfaces about a common axis, said carrier having a surface for engagement with the back surface of said block, said block having one or more dovetail grooves in its back-engaging surface extending across said back surface for engaging and receiving said guiding and clamping strip, said channel-like strip having side flanges, said dovetail groove being substantially coextensive lengthwise with respect to said groove and having shoulders engageable with the flanges of said clamping strip, the head of said bolt lying between said flanges and engaging them to hold the bolt against rotation and the shank extending through openings in the bottom of said channel and in said carrier, the depth of said groove being greater than the height of said head and beam-like strip when assembled.

3. For use in a clutch or brake construction comprising a friction block carrier and a friction block: a beam-like channel-like guiding and clamping strip for guiding and clamping said block to said carrier, and one or more threaded clamping bolts for drawing said strip toward said carrier, said friction block having face and back surfaces, said face surface being a friction surface for frictionally engaging a complementary relatively rotatable friction surface to check relative rotation between said surfaces about a common axis, said carrier having a surface for engagement with the back surface of said block, said block having one or more dovetail grooves in its back-engaging surface extending across said back surface for engaging and receiving said guiding and clamping strip, said channel-like strip being substantially coextensive lengthwise with respect to said groove and having side flanges, said dovetail groove having shoulders engageable with the flanges of said clamping strip, the head of said bolt lying between said flanges and the shank extending through openings in the bottom of said channel and in said carrier, the depth of said groove being greater than the height of said head and beam-like strip when assembled.

4. For use in a clutch or brake construction comprising a friction block carrier and a friction block: a beam-like channel-like guiding and clamping strip for guiding and clamping said block to said carrier, and one or more threaded clamping bolts for drawing said strip toward said carrier, said friction block having face and back surfaces, said face surface being a friction surface for frictionally engaging a complementary relatively rotatable friction surface to check relative rotation between said surfaces about a common axis, said carrier having a surface for engagement with the back surface of said block, said block having one or more dovetail grooves in its back-engaging surface extending across said back surface for engaging and receiving said guiding and clamping strip, said channel-like strip being substantially coextensive lengthwise with respect to said groove and having side flanges, said dovetail groove having shoulders engageable with the flanges of said clamping strip, the head of said bolt lying between said flanges and engaging them to hold the bolt against rotation and the shank extending through openings in the bottom of said channel and in said carrier, the depth of said groove being greater than the height of said head and beam-like strip when assembled.

5. For use in a clutch or brake construction comprising a friction block carrier and a friction block: a beam-like channel-like guiding and clamping strip for guiding and clamping said block to said carrier, and one or more clamping bolts for drawing said strip toward said carrier said friction block having face and back surfaces, said face surface being a friction surface for frictionally engaging a complementary relatively rotatable friction surface to check relative rotation between said surfaces about a common axis, said carrier having a surface for engagement with the back surface of said block, said block having one or more dovetail grooves in its back-engaging surface extending across said back surface for engaging and receiving said guiding and clamping strip, said channel-like strip being substantially coextensive lengthwise with respect to said groove and having uniformly sloping side flanges, said dovetail groove having uniformly sloping sides engageable with the sloping flanges of said clamping strip throughout the length of said strip, the head of said bolt lying between said flanges and engaging them to hold the bolt against rotation and the shank extending through apertures in the bottom of said channel and in said carrier, the depth of said groove being greater than the height of said head and beam-like strip when assembled.

6. For use in a clutch or brake construction comprising a friction block carrier, a friction block, and one or more threaded clamping bolts for drawing a clamping strip toward said carrier; a beam-like channel-like guiding and clamping strip for guiding and clamping said block to said carrier, said friction block having face and back surfaces, said face surface being a friction surface for frictionally engaging a complementary relatively rotatable friction surface to check relative rotation between said surfaces about a common axis, said carrier having a surface for engagement with the back surface of said block, said block having one or more dovetail grooves in its back-engaging surface extending across said back surface for engaging and receiving said guiding and clamping strip, said channel-like strip being substantially coextensive lengthwise with respect to said groove and having side flanges, said dovetail groove having shoulders engageable with the flanges of said clamping strip, the head of said bolt lying between said flanges and the shank extending through openings in the bottom of said channel and in said carrier, the depth of said groove being greater than the height of said head and beam-like strip when assembled.

7. For use in a clutch or brake construction comprising a friction block carrier, a friction block, and one or more threaded clamping bolts for drawing a clamping strip toward said carrier: a beam-like channel-like guiding and clamping strip for guiding and clamping said block to said carrier, said friction block having face and back surfaces, said face surface being a friction surface for frictionally engaging a complementary relatively rotatable friction surface to check relative rotation between said surfaces about a common axis, said carrier having a surface for engagement with the back surface of said block, said block having one or more dovetail grooves in its back-engaging surface extending across said back surface for engaging and receiving said guiding and clamping strip, said channel-like strip being substantially coextensive lengthwise with respect to said groove and having side flanges, said dovetail groove having shoulders engageable with the flanges of said clamping strip, the head of said bolt lying between said flanges and engaging them to hold the bolt against rotation and the shank extending through openings in the bottom of said channel and in said carrier, the depth of said groove being greater than the height of said head and beam-like strip when assembled.

8. For use in a clutch or brake construction comprising a friction block carrier, a friction block, and one or more threaded clamping bolts for drawing a clamping strip toward said carrier: a beam-like channel-like guiding and clamping strip for guiding and clamping said block to said carrier, said friction block having face and back surfaces, said face surface being a friction surface for frictionally engaging a complementary relatively rotatable friction surface to check relative rotation between said surfaces about a common axis, said carrier having a surface for engagement with the back surface of said block, said block having one or more dovetail grooves in its back-engaging surface extending across said back surface for engaging and receiving said guiding and clamping strip, said channel-like strip having uniformly sloping side flanges, said dovetail groove being substantially coextensive lengthwise with respect to said groove and having uniformly sloping sides engageable with the sloping flanges of said clamping strip throughout the length of said strip, the head of said bolt lying between said flanges and engaging them to hold the bolt against rotation and the shank extending through apertures in the bottom of said channel and in said carrier, the depth of said groove being greater than the height of said head and beam-like strip when assembled.

9. For use with a clutch or brake construction comprising a friction block carrier, a friction block, and a beam-like channel-like guiding and clamping strip for guiding and clamping said block to said carrier: a threaded clamping bolt for drawing said strip toward said carrier, said friction block having face and back surfaces, said face surface being a friction surface for frictionally engaging a complementary relatively rotatable friction surface to check relative rotation between said surfaces about a common axis, said carrier having a surface for engagement with the back surface of said block, said block having one or more dovetail grooves in its back-engaging surface extending across said back surface for engaging and receiving said guiding and clamping strip, said channel-like strip being substantially coextensive lengthwise with respect to said groove and having side flanges, said dovetail groove having shoulders engageable with the flanges of said clamping strip, the head of said bolt lying between said flanges and the shank extending through openings in the bottom of said channel and in said carrier, the depth of said groove being greater than the height of said head and beam-like strip when assembled.

10. For use with a clutch or brake construction comprising a friction block carrier, a friction block, and a beam-like channel-like guiding and clamping strip for guiding and clamping said block to said carrier: a threaded clamping bolt for drawing said strip toward said carrier, said friction block having face and back surfaces, said face surface being a friction surface for frictionally engaging a complementary relatively rotatable friction surface to check relative rotation between said surfaces about a common axis, said carrier having a surface for engagement with the back surface of said block, said block having one or more dovetail grooves in its back-engaging surface extending across said back surface for engaging and receiving said guiding and clamping strip, said channel-like strip being substantially coextensive lengthwise with respect to said groove and having side flanges, said dovetail groove having shoulders engageable with the flanges of said clamping strip, the head of said bolt lying between said flanges and engaging them to hold the bolt against rotation and the shank extending through openings in the bottom of said channel and in said carrier, the depth of said groove being greater than the height of said head and beam-like strip when assembled.

11. For use with a clutch or brake construction comprising a friction block carrier, a friction block, and a beam-like channel-like guiding and clamping strip for guiding and clamping said block to said carrier: a threaded clamping bolt for drawing said strip toward said carrier, said friction block having face and back surfaces, said face surface being a friction surface for frictionally engaging a complementary relatively rotatable friction surface to check relative rotation between said surfaces about a common axis, said carrier having a surface for engagement with the back surface of said block, said block having one or more dovetail grooves in its back-engaging surface extending across said back surface for engaging and receiving said guiding and clamping strip, said channel-like strip being substantially coextensive lengthwise with respect to said groove and having uniformly sloping side flanges, said dovetail groove having uniformly sloping sides engageable with the sloping flanges of said clamping strip throughout the length of said strip, the head of said bolt lying between said flanges and engaging them to hold the bolt against rotation and the shank extending through apertures in the bottom of said channel and in said carrier, the depth of said groove being greater than the height of said head and beam-like strip when assembled.

12. A clutch or brake construction comprising a friction block carrier, a friction block, a beam-like channel-like guiding and clamping strip for guiding and clamping said block to said carrier, and one or more threaded clamping bolts for drawing said strip toward said carrier, said friction block having face and back surfaces, said face surface being a friction surface for frictionally engaging a complementary relatively rotatable friction surface to check relative rotation between said surfaces about a common axis, said carrier having a surface for engagement with the back surface of said block said block having one or more dovetail grooves in its back-engaging surface extending across said back surface for engaging and receiving said guiding and clamping strip, said channel-like strip being substantially coextensive lengthwise with respect to said groove and having side flanges, said dovetail groove having shoulders engageable with the flanges of said clamping strip, the head of said bolt lying between said flanges and engaging their upper edges to support the flanges against inward collapse and to hold the bolt against rotation and the shank extending through openings in the bottom of said channel and in said carrier, the depth of said groove being greater than the height of said head and beam-like strip when assembled.

13. For use in a clutch or brake construction comprising a friction block carrier and a friction block: a beam-like channel-like guiding and clamping strip for guiding and clamping said block to said carrier, and one or more threaded clamping bolts for drawing said strip toward said carrier, said friction block having face and back surfaces, said face surface being a friction surface for frictionally engaging a complementary relatively rotatable friction surface to check relative rotation between said surfaces about a common axis, said carrier having a surface for engagement with the back surface of said block, said block having one or more dovetail grooves in its back-engaging surface extending across said back surface for engaging and receiving said guiding and clamping strip, said channel-like strip being substantially coextensive lengthwise with respect to said groove and having side flanges, said dovetail groove having shoulders engageable with the flanges of said clamping strip, the head of said bolt lying between said flanges and engaging their upper edges to support the flanges against inward collapse and to hold the bolt against rotation and the shank extending through openings in the bottom of said channel and in said carrier, the depth of said groove being greater than the height of said head and beam-like strip when assembled.

14. For use in a clutch or brake construction comprising a friction block carrier, a friction block, and one or more threaded clamping bolts for drawing a clamping strip toward said carrier: a beam-like channel-like guiding and clamping strip for guiding and clamping said block to said carrier, said friction block having face and back surfaces, said face surface being a friction surface for frictionally engaging a complementary relatively rotatable friction surface to check relative rotation between said surfaces about a common axis, said carrier having a surface for engagement with the back surface of said block, said block having one or more dovetail grooves in its back-engaging surface extending across said back surface for engaging and receiving said guiding and clamping strip, said channel-like strip being substantially coextensive lengthwise with respect to said groove and having side flanges, said dovetail groove having shoulders engageable with the flanges of said clamping strip, the head of said bolt lying between said flanges and engaging their upper edges to support the flanges against inward collapse and to hold the bolt against rotation and the shank extending through openings in the bottom of said channel and in said carrier, the depth of said groove being greater than the height of said head and beam-like strip when assembled.

15. For use with a clutch or brake construction comprising a friction block carrier, a friction block, and a beam-like channel-like guiding and clamping strip for guiding and clamping said block to said carrier, a threaded clamping bolt for drawing said strip toward said carrier, said friction block having face and back surfaces, said face surface being a friction surface for frictionally engaging a complementary relatively rotatable friction surface to check relative rotation between said surfaces about a common axis, said carrier having a surface for engagement with the back surface of said block, said block having one or more dovetail grooves in its back-engaging surface extending across said back surface for engaging and receiving said guiding and clamping strip, said channel-like strip being substantially coextensive lengthwise with respect to said groove and having side flanges, said dovetail groove having shoulders engageable with the flanges of said clamping strip, the head of said bolt lying between said flanges and engaging their upper edges to support the flanges against inward collapse and to hold the bolt against rotation and the shank extending through openings in the bottom of said channel and in said carrier, the depth of said groove being greater than the height of said head and beam-like strip when assembled.

HANS R. AMUNDSEN.

REFERENCES CITED

The following references are of record in the file of this patent:

UNITED STATES PATENTS

| Number | Name | Date |
|---|---|---|
| 1,467,656 | Sturt | Sept. 11, 1923 |
| 1,896,797 | Leamy | Feb. 7, 1933 |

FOREIGN PATENTS

| Number | Country | Date |
|---|---|---|
| 273,861 | Italy | Mar. 5, 1930 |
| 286,611 | Great Britain | Aug. 30, 1928 |
| 517,557 | Great Britain | Feb. 1, 1940 |
| 757,380 | France | Dec. 26, 1933 |